(12) United States Patent
Weigert (10) Patent No.: US 7,246,951 B2
(45) Date of Patent: Jul. 24, 2007

(54) METHOD AND APPARATUS FOR OPTICALLY COUPLING AN OPTICAL WAVEGUIDE TO AN OPTICAL MODULE

(75) Inventor: Martin Weigert, Hardt (DE)

(73) Assignee: Infineon Technologies Fiber Optics GmbH, Berlin (DE)

( * ) Notice: Subject to any disclaimer, the term of this patent is extended or adjusted under 35 U.S.C. 154(b) by 32 days.

(21) Appl. No.: 11/257,678

(22) Filed: Oct. 25, 2005

(65) Prior Publication Data

US 2006/0093261 A1 May 4, 2006

(30) Foreign Application Priority Data

Oct. 27, 2004 (EP) ................... 04090412

(51) Int. Cl.
- *G02B 6/36* (2006.01)
- *G02B 6/26* (2006.01)
- *G02B 6/42* (2006.01)

(52) U.S. Cl. ............... 385/90; 385/15; 385/25; 385/31; 385/39; 385/50; 385/88; 385/91; 385/92; 385/93

(58) Field of Classification Search ............ 385/90
See application file for complete search history.

(56) References Cited

U.S. PATENT DOCUMENTS

| | | | |
|---|---|---|---|
| 4,738,508 A * | 4/1988 | Palmquist | 385/78 |
| 5,940,564 A | 8/1999 | Jewell | |
| 6,287,016 B1 | 9/2001 | Weigel | |
| 6,470,120 B2 | 10/2002 | Green et al. | |
| 6,742,936 B1 * | 6/2004 | Knecht et al. | 385/67 |
| 6,935,791 B2 * | 8/2005 | Ban et al. | 385/90 |
| 2005/0220417 A1 * | 10/2005 | Hurt | 385/52 |
| 2006/0088252 A1 * | 4/2006 | Althaus et al. | 385/88 |

FOREIGN PATENT DOCUMENTS

| | | |
|---|---|---|
| DE | 23 58 785 C2 | 6/1975 |
| DE | 199 09 242 A1 | 8/2000 |
| JP | 04328506 | 11/1992 |

* cited by examiner

*Primary Examiner*—Frank G. Font
*Assistant Examiner*—Ryan Lepisto
(74) *Attorney, Agent, or Firm*—Eschweiler & Associates, LLC

(57) ABSTRACT

A method for optical coupling an optical waveguide to an optical unit arranged in or on an optical module, a corresponding optical module, coupling element, and a kit of coupling elements is provided. The optical module has a reference geometry which defines a first axis of symmetry. Any offset between a first optical axis of the optical unit and the axis of symmetry of the reference geometry is determined. A coupling element corrects the offset and has an input/output area on opposite faces having offset second and third optical axes. Light input along the second optical axis is guided in the coupling element and output along the third optical axis, and vice versa. Once assembled, the center axis of the coupling element coincides with the axis of symmetry of the optical module, and the first optical axis of the optical unit and second optical axis of the coupling element coincide.

6 Claims, 4 Drawing Sheets

METHOD AND APPARATUS FOR OPTICALLY COUPLING AN OPTICAL WAVEGUIDE TO AN OPTICAL MODULE

REFERENCE TO RELATED APPLICATION

This application claims the benefit of the priority date of European patent application 04 090 412.0, filed on Oct. 27, 2004, the contents of which is herein incorporated by reference in its entirety.

Field of the Invention

The present invention relates to a method for optical coupling of an optical waveguide to an optical unit of an optical module, an optical module, a coupling element for an optical module, and to a kit having a plurality of coupling elements.

BACKGROUND OF THE INVENTION

One general problem that occurs is how to effectively couple an optical unit, such as a vertically emitting laser or a photodiode, to an optical waveguide. For this purpose, it is known for the optical waveguide to be actively adjusted with respect to the optical unit. In this case, the optical waveguide is aligned for a maximum input or output power during operation of the optical unit, and is fixed in this position. This active adjustment process is, however, very time-consuming and costly, and is accordingly not suitable for large-scale use.

DE 199 09 242 A1 discloses an optoelectronic module in which a leadframe with an optoelectronic transducer is positioned in a module housing, and is encapsulated using a translucent material which can be molded. Light is input or output via an optical fiber, which is coupled to a connecting stub on the module housing. The driver module and the receiving module for the optoelectronic transducer are also located on the leadframe.

U.S. Pat. No. B2 6,470,120 describes a method and an apparatus, in which both an optical component and an associated optical waveguide are each arranged on an inner sleeve, which is formed eccentrically with respect to an outer sleeve that is arranged fixed in an outer frame. The inner sleeve is in this case arranged such that it can in each case rotate in a corresponding hole in the outer sleeve. Furthermore, the optical component and the optical waveguide are each arranged eccentrically in the inner sleeve. The position of the optical component and of the optical waveguide can in each case be adjusted by rotation of the outer and/or inner sleeve, and they can be positioned with respect to one another by suitable rotation of the respective inner and outer sleeves.

DE A 23 58 785 discloses an adjustable coupling apparatus for optical components, in which an optical fiber is arranged in an eccentric hole in a connector part, which is arranged in a hole, which is likewise eccentric, in a connector eccentric, with the connector eccentric being mounted centrally on an eccentric guide. The inlet surface of the optical fiber can be aligned with the position of an optical element, which is to be optically coupled to the optical fiber, by superimposition of the rotary movements of the connector part and of the connector eccentric.

The eccentric arrangement of the optical fiber with respect to the coupling apparatus has been found to be disadvantageous with the arrangement in DE A 23 58 785. For example, an eccentric arrangement of the optical fibers in the overall connector system can lead to tolerance problems. Particularly in the situation in which the geometry of an optical connector which contains the optical fibers to be coupled cannot be flexibly matched, an eccentric position of the optical fibers can lead to design and tolerance problems.

SUMMARY OF THE INVENTION

The present invention overcomes the limitations of the prior art. Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present invention is accordingly based on the object of providing a method for optical coupling of an optical waveguide to an optical unit of an optical module, a corresponding optical module, a coupling element for an optical module such as this, and a kit having a plurality of such coupling elements, which allow the alignment of an optical waveguide with respect to a light-emitting or light-detecting optical unit on the one hand without the need for active adjustment and on the other hand without the need for an eccentric arrangement of an optical waveguide on the module, in a simple and cost-effective manner. This is achieved by a method, optical module, coupling element, and a kit as claimed in the present invention.

Accordingly, the optical Module has a reference geometry which accurately defines an axis of symmetry of the optical module. First of all, the magnitude and direction of any offset between the (first) optical axis of the optical unit and the axis of symmetry of the reference geometry is determined. Furthermore, a coupling element is provided which has a first face that faces the optical unit, and a second face that can be coupled to an optical waveguide.

The coupling element according to the invention has a center axis. The first face of the coupling element has a light input/output area with a (second) optical axis. The second face of the coupling element has a light input/output area with a (third) optical axis, which runs parallel to the second optical axis and coincides with the center axis. The coupling element is in this case designed in such a way that light which is input along the second optical axis is guided in the coupling element in such a way that it is output along the third optical axis, and vice versa (e.g., a light which is input along the third optical axis is output along the second optical axis). The coupling element thus provides an optical eccentric, in which the light runs from a first axis on one side to a second axis on the other side.

In this case, according to one aspect of the invention, one such coupling element is selected from a plurality of coupling elements for which one coupling element the magnitude of the offset between the second and the third optical axes is essentially equal to the magnitude of the offset between the first optical axis of the optical unit and the axis of symmetry of the reference geometry. A coupling element such as this is arranged passively, that is to say without any active adjustment, with respect to the optical module in such a way that the center axis of the coupling element coincides with the axis of symmetry of the optical module, such that the optical axis of an optical waveguide coupled to it also coincides with the axis of symmetry of the optical module, that is to say it is arranged centrally with respect to the optical module.

The coupling element is rotated about its center axis with respect to the optical module until the first optical axis of the optical unit and the second optical axis of the coupling element coincide, that is to say until the direction of the offset between the second optical axis and the third optical axis is the same as the direction of the offset between the first optical axis of the optical unit and the first axis of symmetry of the reference geometry. The offset between the two optical axes of the coupling element then, in terms of magnitude and direction, exactly reflects the offset between the optical axis of the optical unit and the axis of symmetry of the reference geometry.

The coupling element in this case provides an offset input area on its first face, which faces the optical unit. The second face of the coupling element, which faces an optical fiber or an optical connector, in contrast inputs or outputs light along the center axis, so that a connector which has been connected is arranged centrally with respect to the optical module. During rotation of the coupling element with respect to the optical module in order to produce a match between the first optical axis of the optical unit and the second optical axis of the coupling element, the second face of the coupling element, which faces the optical fiber or the optical connector, just rotates about its own center axis.

The solution according to the invention is thus based on the idea of determining the offset between the ideal position of an optical unit and the actual position, and of using a coupling element, which compensates for this offset, in order to compensate for this offset. The coupling element in this case provides an optical eccentric which has two mutually offset optical axes and two mutually offset light input and output surfaces at both of its ends. In this case, one coupling element is selected and is arranged in such a way that the offset optical axis of the coupling element is made to match the optical axis of the light-emitting or light-receiving optical unit. The light guidance in the coupling element results in the light which is input along the first axis being output along the other axis, and vice versa. The light guidance in the coupling element thus compensates for the offset between the optical axis of the optical unit (which is not aligned ideally with respect to the reference geometry) and the optical axis of the optical fiber to be connected or of the connector to be connected. This means that a non-ideal position of an optical unit with respect to the optical module can be achieved without the need for an eccentric arrangement of an optical fiber, which is to be connected, on the optical module.

In one exemplary aspect of the invention, the coupling element has an internal optical waveguide, one of whose ends is located on the second optical axis, and whose other end is located on the third optical axis, with the optical waveguide having a curved profile between the two ends. The optical waveguide thus compensates for the offset between the two optical axes of the coupling element. The optical waveguide may be in the form of a separate part, for example a glass fiber, but may also be formed by the coupling element itself. In the latter case, the coupling element is, for example, a plastic part in which an area or portion with a different refractive index provides the optical waveguide.

By way of example, the light guidance that is provided according to the invention in the coupling element can also be provided by imaging optics, rather than by an optical waveguide. By way of example, the imaging optics have at least two lenses, with one lens being arranged in the area of the first face of the coupling element, and the other lens being arranged in the area of the second face of the coupling element. In a first refinement, the lenses may in this case be part of the coupling element. By way of example, they are formed by appropriate shaping of the outer surfaces of the coupling element. In this case, they may also be Fresnel lenses, which are formed in the plastic material of the coupling element. In a second refinement, the lenses are in the form of separate elements, but are connected to the coupling element. A third variant provides for at least that lens which faces the optical unit to be formed in the optical module, for example in plastic encapsulation of the optical module.

If they are formed using plastic, the lenses may, for example, be cast or molded.

The external contour of the coupling element is, for example, cylindrical, but can also assume other shapes, for example being polygonal with N sides. In this example, the coupling element is attached to the optical module by means of the reference geometry. If the external contour of the coupling element is cylindrical, it is, for example, inserted into a connecting stub on the optical module, which provides the reference geometry.

In principle, the optical fiber can be attached to the optical module in two ways. Firstly, it is possible for the optical fiber likewise to be attached to the reference geometry. In the situation where the reference geometry is formed by a cylindrical connecting stub, the coupling element is first of all, for example, inserted into the connecting stub, followed by the optical fiber, with the end face of the optical fiber coming to rest on the second face of the coupling element. Secondly, the optical fiber can be attached to the coupling element. For this purpose, the coupling element has holding structures on the face which faces away from the optical unit, for connection of an optical waveguide or of an optical connector. These holding structures may, for example, be latching structures which are used for connection of an optical connector. In both stated versions, the optical axis of the optical waveguide that is to be connected is located on the center axis of the coupling element. Since the center axis of the coupling element is once again located on the axis of symmetry of the reference geometry, this means that, overall, the optical axis of the optical waveguide that is to be connected is also located on the axis of symmetry of the reference geometry, that is to say the optical waveguide that is to be connected is aligned centrally with respect to the optical module. The offset of the light-emitting or light-detecting optical unit from its ideal position is compensated for by the coupling element (the optical eccentric).

In another example, the coupling element is integral, that is to say the coupling element and the means which are formed in the coupling element and guide the light in the coupling element in such a way that the light which is input along the optical axis of one face is output along the optical axis of the other face, form one part.

Image recognition methods, for example, are used to determine any offset between the optical axis of the optical element and the mechanical axis of the reference geometry. By way of example, the reference geometry and the current position of the optical unit are recorded by means of a camera for this purpose, and the offset of the optical unit with respect to the reference geometry is determined by means of a pattern recognition program.

The reference geometry, for example, is used not only as a reference for the arrangement of the optical unit, but also for mechanical coupling and attachment of the coupling element to the optical unit. Such attachment can be carried out easily, since the axis of symmetry of the reference geometry and the center axis of the coupling element coincide after attachment.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

Figure 1:
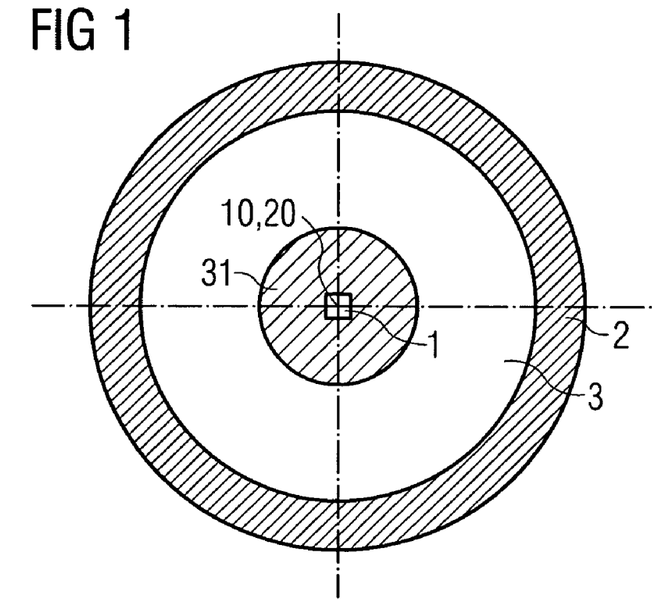
FIG. 1 shows, schematically, the ideal arrangement of an optical unit on an optical module, which has a reference geometry.

The fundamental problem on which the present invention is based will be explained first of all, with reference to FIGS. 1 to 3. FIG. 1 shows a plan view of an optical unit 1, which is arranged on a reference surface 3 of an optical module (not illustrated in any more detail). The optical module is, in particular, an optoelectronic transmission module and/or an optoelectronic receiving module, for example an optoelectronic transceiver. The reference surface 3 is, for example, the surface of a mount substrate, on which the optical unit 1 is mechanically mounted, and has electrical contact made with it, in a manner known per se.

Fundamentally, the optical unit 1 may be designed in any desired manner. For example, it is a light-emitting diode (LED), a vertically emitting laser diode (VCSEL), a photodiode, a mirror or some other optical functional surface via which light is received or emitted. The optical unit 1, in another example, is in the form of a prefabricated chip, which is placed on the reference surface 3, and is thus also referred to in the following text as an optical chip. The optical unit 1 has an optical axis 10 which is located at the intersection of the axes of the coordinate system illustrated by dashed lines in FIG. 1. Light is emitted from the optical chip 1, and is received by it, along the optical axis 10. The optical axis 10 runs at right angles to the plane of the drawing in FIG. 1.

A reference geometry 2 is formed on the optical unit. The reference geometry 2 has a symmetrical shape. In the illustrated exemplary embodiment, the reference geometry 2 is cylindrical, so that it is circular when viewed in the form of a section and when viewed from the front. However, it should be noted at this point that other geometric shapes are also possible, for example a polygon with N sides. In addition, the reference geometry need not have a continuous geometric structure. It can likewise comprise individual points or areas, for example three or four points, which are not connected to one another. However, it is important that the reference geometry has internal symmetry which defines a first axis of symmetry 20.

In FIG. 1, the axis of symmetry 20 of the reference structure 2 coincides with the optical axis 10 of the optical chip 1, since the optical chip 1 is arranged precisely at the center of the reference geometry. This is the ideal state, but in practice can be achieved only rarely. In general, the optical chip 1 will be arranged within an area 31 of the reference surface 3. This area 31 indicates an offset area in which the optical axis of the chip 1 does not match the geometric axis of the reference structure 2.

Figure 2:
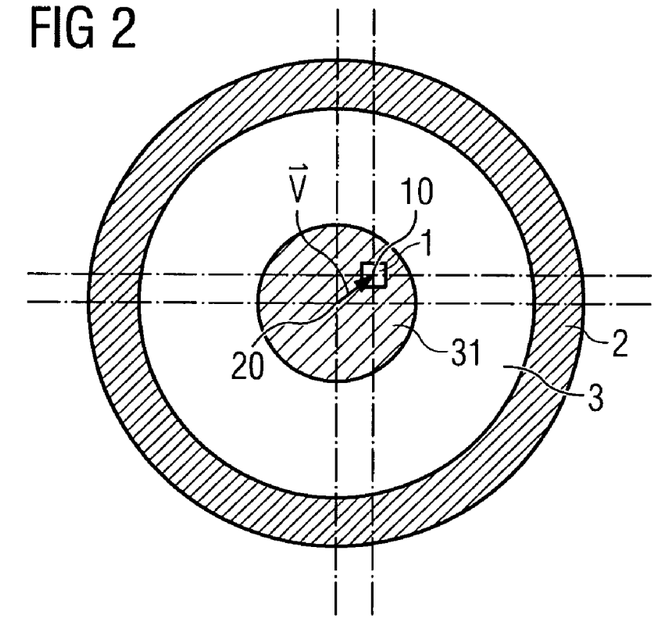
FIG. 2 shows, schematically, the arrangement of an optical unit in an optical module, which has a reference geometry, in an offset position.

FIG. 2 now shows the realistic practical situation, in which the optical chip 1 is mounted on the reference surface of the optical unit with an offset with respect to the reference geometry 2. This means that the optical axis 10 of the optical chip 1 and the axis of symmetry 20 of the reference geometry 2 no longer coincide, but in fact run parallel to one another, with an offset. The offset is a vector v with a specific magnitude and a specific direction.

Figure 3:
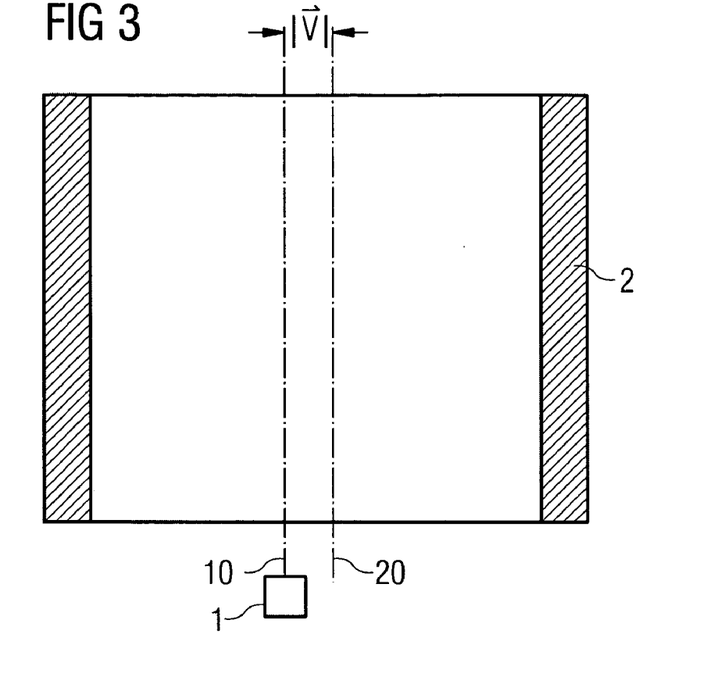
FIG. 3 shows a sectional view through a cylindrical reference geometry corresponding to the arrangement shown in FIG. 2, additionally illustrating the optical unit.

FIG. 3 shows the arrangement illustrated in FIG. 2, in the form of a section view from the side. The optical module and the reference surface 31 are not shown in this case. The illustration shows the reference geometry 2 and the associated axis of symmetry 20, as well as the unit 1, which is shifted through the vector v with respect to it, and its optical axis 10.

A specially designed coupling structure is now provided in order to compensate for the offset when an optical waveguide is connected. The coupling structure compensates for both the magnitude and the direction of the offset.

Figure 4:
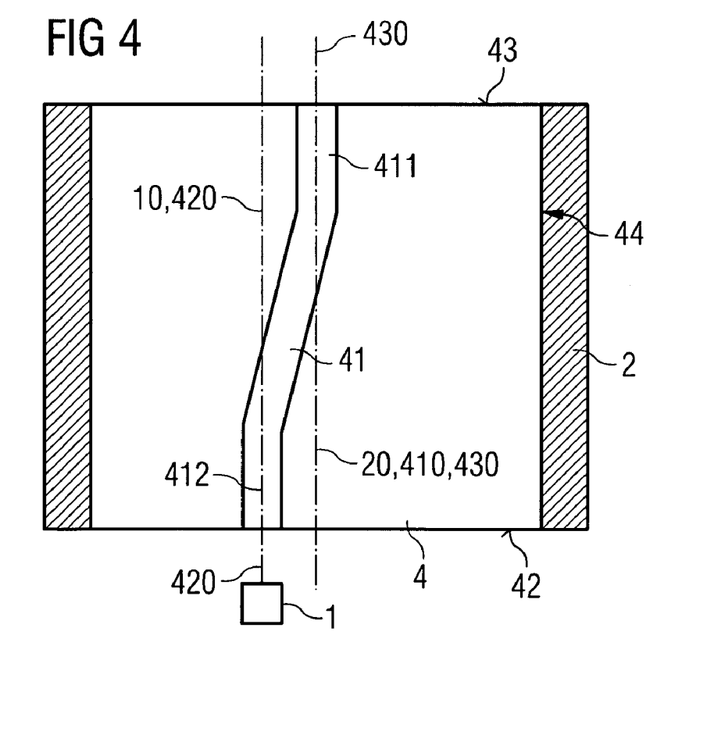
FIG. 4 shows a first exemplary embodiment of a coupling element which forms an optical eccentric and is inserted into a cylindrical connecting stub, with an internal optical waveguide being integrated in the coupling element.

The coupling structure has a coupling element 4, a first exemplary embodiment of which is illustrated in FIG. 4. The coupling element 4 has a first face 42, which faces the optical unit 1, and a second face 43, which faces an optical connector that is to be connected and an optical fiber that is to be connected. The coupling element 4 has a center axis 410 which represents the axis of symmetry of the coupling element, in terms of its external contours. In the illustrated exemplary embodiment, the external contour 44 of the coupling element 4 is cylindrical, that is to say the coupling element 4 forms a cylinder. Furthermore, the reference geometry 2 is formed by a cylindrical connecting stub. The cylindrical coupling element 4 has an external diameter which corresponds precisely to the internal diameter of the cylindrical connecting stub 2, so that the coupling element 4 can be inserted into the connecting stub 2 essentially without any play.

It should be noted that the center axis 410 can alternatively be defined by an internal contour of the coupling element 4, particularly when the coupling element is connected to the reference geometry of the optical module by means of an internal contour such as this.

The coupling element 4 now has two mutually offset input/output areas with optical axes 420, 430. The first input/output area with the optical axis 420 is formed on the first face 42 of the coupling element, and the other input/output area with the second optical axis 430 is formed on the second face 43 of the coupling element. The offset between the two axes 420, 430 is in this case chosen such that it just corresponds to the offset between the optical axis 10 of the optical element and the optical axis 20 of the reference geometry. The light is guided within the coupling element 4 in such a way that light which is coupled to the first face 42 along the axis 420 is output along the axis 430 on the second face 43 of the coupling element, and light which is input along the axis 430 of the second face 43 is output along the axis 420 of the first face 42 of the coupling element. The coupling element therefore forms an "optical eccentric".

In order to guide the light in this way in the optical eccentric, an optical waveguide 41 is formed in the optical eccentric in the exemplary embodiment shown in FIG. 4. The first end 412 of the optical waveguide 41, whose end surface forms the first input/output area, is in this case located on the optical axis 420, and the other end 411 of the optical waveguide 41, whose end surface forms the other input/output area, is located on the optical axis 430. The optical waveguide 41 is curved between them.

There are a number of possible ways to form the optical waveguide 41 in the coupling element 4. In a first embodiment variant, the optical waveguide 41 is provided as a separate optical fiber, which is inserted into a corresponding hole in the coupling element 4. A correspondingly curved optical fiber can also be extrusion-coated with the material of the optical eccentric. In a second refinement, the optical fiber 41 is in the form of an integral component of the coupling element 4 and is formed, for example, by an area or portion with a different refractive index.

It should be noted that, in the situation in which the center axis 410 of the coupling element 4 matches the optical axis 430 of the second face 43 of the coupling element, these are located one on top of the other. Since, furthermore, the coupling element 4 is arranged in the connecting stub 2, the axis of symmetry 20 of the connecting stub 2 and the axes 410, 430 are also coincident.

Provision is now made for a coupling element 4 to be selected in which the offset between the two optical axes 420, 430 is essentially the same as the offset between the optical axis 10 of the optical chip 1 and the axis of symmetry 20 of the reference geometry, to be precise in terms of both magnitude and (after appropriate rotation of the coupling element) direction: This means that the optical axis 420 on the side 42 of the coupling element which faces the optical element 1 coincides with the optical axis 10 of the optical chip 1. In this way, an optical fiber which is connected to the face 43 of the coupling element 4 is optically ideally coupled to the optical chip 1 despite the offset of the optical chip 1 with respect to the ideal position, that is to say the input and output power are a maximum. In this case, this is achieved without any need for active adjustment.

The reference geometry 2 and the coupling element 4 in this case form corresponding guide structures.

The following method steps are carried out in order to align an optical fiber with respect to an optical unit 1. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated.

Once the optical chip 1 has been mounted on the reference surface 3 (see FIGS. 1, 2) of the optical module, a check is first carried out to determine the offset v of the optical chip 1 and of the optical axis 10 of the optical chip 1 with respect to the axis of symmetry 20 of the reference geometry 2, which is provided on the optical module. A check is thus carried out to determine the point at which the offset field 31 of the optical chip 1 was actually placed. In one example, a check such as this is carried out by means of an image recognition method. For example, the reference geometry 2 and the optical chip 1 are recorded by a camera, and their position is determined by a pattern recognition system. The pattern recognition system determines the offset (e.g., discrepancy between the actual position and the nominal position) of the optical chip 1 with respect to the reference geometry 2. The offset is a vector with a specific length and a specific direction.

Once the offset has been determined, one coupling element is selected from a kit with a plurality of coupling elements which are in the form of optical eccentrics, this coupling element being that for which the offset between the two optical axes 420, 430 is equal to the determined offset between the optical axis 10 of the optical unit and the axis of symmetry 20 of the reference geometry, so that the existing offset can be compensated for. A coupling element 4 is thus chosen for which the distance between the two optical axes 420, 430 is approximately equal to the magnitude of the offset vector.

The coupling element 4 is attached to the optical module with respect to the reference geometry 2, and is rotated to a position in which the direction of the offset also matches. During the rotation of the coupling element 4, the optical axis 420 is made to coincide with the optical axis 10 of the optical chip 1. It should be noted that a rotary movement of the coupling element 4 shifts only the input area 412, which faces the optical chip 1, and the associated axis 420. The area 411 of the optical waveguide, which is arranged on that face 43 of the coupling element 4 which faces an optical connector, just rotates about its own axis during a rotary movement of the coupling element, since the optical axis 430 on the second face 43 of the coupling element 4 coincides with the center axis 410. That face 43 of the coupling element 4 which is to be coupled to the optical connector is thus invariant with respect to rotation of the coupling element, so that the optical axis of an optical connector that is to be connected can be aligned permanently and exactly with respect to the optical axis 430, and with respect to the center axis 410 of the coupling element.

Figure 5:
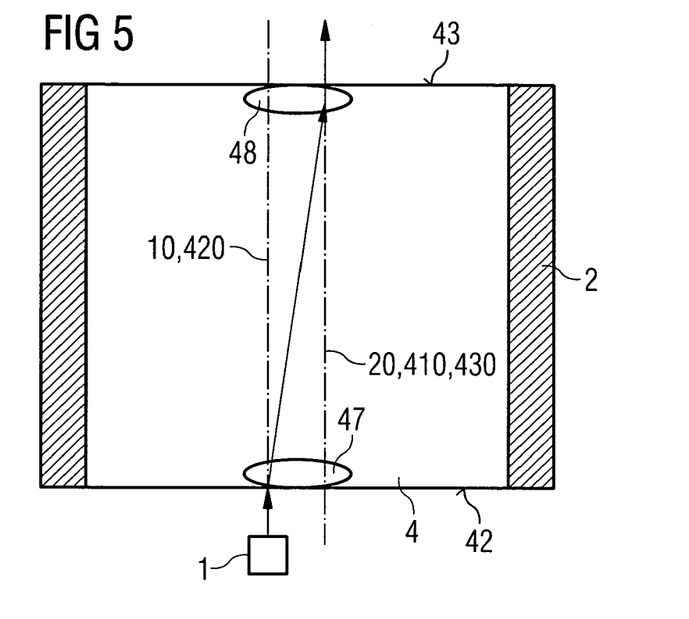
FIG. 5 shows a second exemplary embodiment of a coupling element which forms an optical eccentric and is inserted into a cylindrical connecting stub, with the coupling element comprising imaging optics.

FIG. 5 shows an alternative exemplary embodiment, in which the light is not guided within the coupling element 4 by an optical fiber, but by two lenses 47, 48. The first lens is in this case formed in the area of the first face 42 of the coupling element 4, and the other lens 48 is formed in the area of the second face 43 of the coupling element 4. In a first refinement, the lenses can be formed by the material of the coupling element. In a second refinement, they are formed as separate parts, and are inserted into or placed on the material of the coupling element. In a third refinement, they are arranged outside the actual coupling element. However, in another example, they are integrated in the coupling element. For example, they may be convex lenses or Fresnel lenses. The distance between the two lenses 47, 48 on the two faces 42, 43 of the coupling element 4 is, for example, equal to twice the focal length of the lenses. The light is input into the lenses 47, 48, with an offset with respect to the respective lens axis.

The specific light guidance is thus produced by imaging optics in this refinement. An offset between the optical component 1 and the lower lens 47 results in a "skew angle", which is compensated for again by the second lens 48. Otherwise, there are no changes in comparison with the refinement shown in FIG. 4.

It should be noted that, in the refinement shown in FIG. 5, the input/output area which is provided on the first face 42 of the coupling element is provided with the appropriate optical axis 420 by means of a subarea of the lens 47, which is offset with respect to the lens axis. The same applies to the input/output area, which is provided on the second face 43 of the coupling element 4, with the optical axis 430. The input/output areas and the optical axes 420, 430 are defined by the functional relationship in that light which is input along the first optical axis is output along the other optical axis, with this applying in both directions. The lenses are designed and arranged in such a way as to achieve this functionality.

Figure 6:
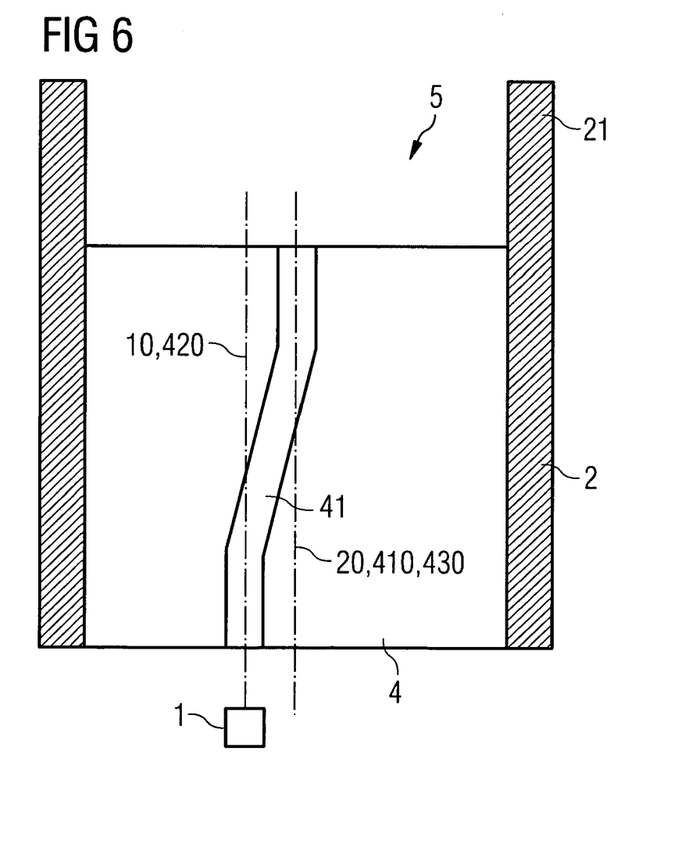
FIG. 6 shows an exemplary embodiment of an arrangement having a coupling element as shown in FIG. 4, with the cylindrical connecting stub additionally being used for connection of an optical waveguide connector.
Figure 7:
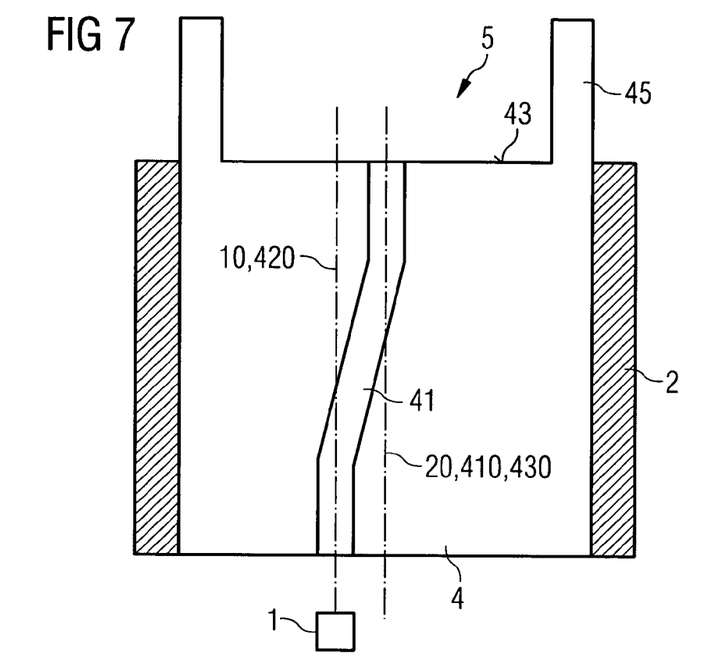
FIG. 7 shows a modification of the arrangement shown in FIG. 4, with the coupling element additionally having holding structures for connection of an optical connector.
Figure 8:
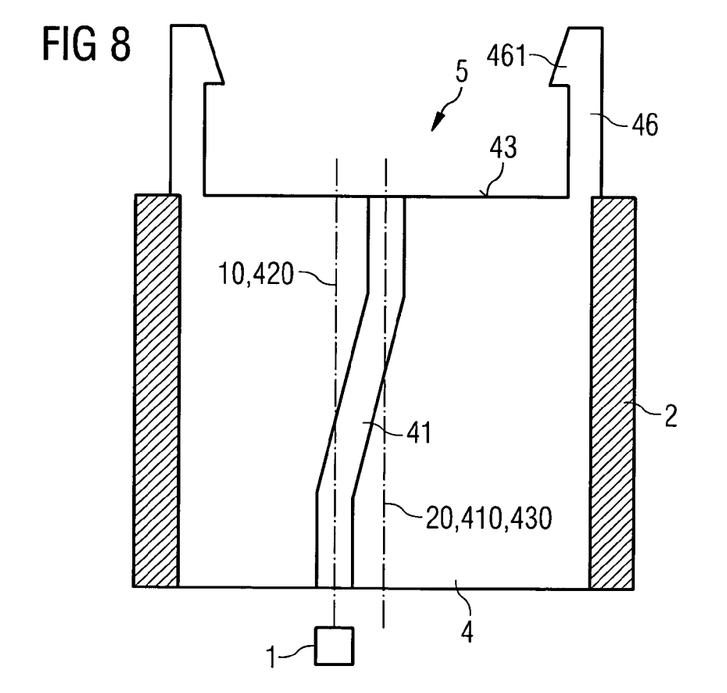
FIG. 8 shows a modification of the exemplary embodiment shown in FIG. 4, with the coupling element additionally forming latching structures for holding an optical connector.

FIGS. 6 to 8 show various options for attachment of an optical fiber or an optical connector. In the refinement shown in FIG. 6, the reference geometry 2, which is formed by a cylindrical connecting stub, has a length such that, after insertion of the coupling element 4 into the connecting stub 2, a projecting area 21 provides a cutout 5 which is used to hold an optical connector. An optical fiber is in this case arranged centrally in an optical connector such as this. In the refinement shown in FIG. 6, an optical fiber or an optical connector is thus connected by means of the reference geometry 2.

In the refinement shown in FIG. 7, on the other hand, the coupling element forms a cylindrical connecting stub 45 on its face 43 which faces away from the optical unit 1, thus providing a holding area 5 for connection of an optical connector. The connecting stub 45 can in this case hold an optical connector or else just a so called "fiber stub", depending on the size.

In the refinement shown in FIG. 8, that end 43 of the coupling element 4 which faces away from the optical unit 1 forms a latching part 46 with latching structures 461, which provides a holding opening 5 for connection of an optical connector. After insertion of an optical connector into the opening 5 and appropriate latching, an optical connector can be connected to a centrally arranged optical fiber, such as by a snap-action connection with the coupling element 4. In the refinements shown in FIGS. 7 and 8, an optical fiber or an optical connector is thus connected to the coupling element 4.

The coupling element 4 may, for example, be composed of metal, ceramic or plastic.

It should be noted in the present example that the coupling element 4 is, as illustrated, attached to the optical module via the reference geometry 2. For this purpose, the coupling element is attached and fixed to the reference geometry by adhesive bonding, welding or some other permanent type of connection. The reference geometry is thus used for attachment of the coupling element. This is admittedly advantageous, but it is not necessarily the case. For example, the reference geometry can also be used on its own to determine an offset of the optical chip 1, and the coupling element 4 can also be attached to the optical module by other attachment structures.

Accordingly, the present invention generally provides a level of particle control that is presently unseen in the ion implantation industry. Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary", as utilized herein, simply denotes an illustrative example or instance, and not necessarily a preferred embodiment, unless otherwise indicated.

What is claimed is:

1. A method for optical coupling of an optical waveguide to an optical unit associated with an optical module, wherein the optical unit has a first optical axis along which light is emitted from or received by the optical unit, and wherein the optical module has a reference geometry that generally defines an axis of symmetry, the method comprising:

determining a magnitude and direction of an offset between the first optical axis of the optical unit and the axis of symmetry of the reference geometry;

selecting a coupling element from a plurality of coupling elements, wherein each coupling element has a first face and a second face, wherein the first face faces the optical unit and the second face is coupled to an optical waveguide, wherein the coupling element has a center axis, the first face of the coupling element has an input/output area with a second optical axis, the second face of the coupling element has an input/output area with a third optical axis which runs parallel to the second optical axis and coincides with the center axis, and wherein light input along the second optical axis is guided in the coupling element and output along the third optical axis, and vice versa, wherein the magnitude of the offset between the second and the third optical axes of the selected coupling element is essentially equal to the magnitude of the offset between the first optical axis of the optical unit and the axis of symmetry of the reference geometry;

positioning the coupling element with respect to the optical module so that the center axis of the coupling element coincides with the axis of symmetry of the optical module; and rotating the coupling element with respect to the optical module until the first optical axis of the optical unit and the second optical axis of the coupling element coincide.

2. The method of claim 1, wherein the light input into the coupling element along the second optical axis or along the third optical axis is input into an internal optical waveguide, wherein a first end of the internal optical waveguide is located on the second optical axis, and wherein a second end of the internal optical waveguide is located on the third optical axis, wherein the internal optical waveguide has a curved profile between the first end and second end.

3. The method of claim 1, wherein light input into the coupling element is transmitted by imaging optics between the first face and the second face of the coupling element, wherein the light input along the second optical axis is output along the third optical axis, and vice versa.

4. The method of claim 1, wherein the coupling element is coupled to the optical module by the reference geometry.

5. The method of claim 4, wherein the reference geometry and the coupling element are coupled to one another by guide structures of one or more of the reference geometry and the coupling element.

6. The method of claim 1, wherein the offset between the optical axis of the optical element and the axis of symmetry of the reference geometry is recorded by image recognition.

* * * * *